United States Patent [19]
Sugiura

[11] Patent Number: 5,130,590
[45] Date of Patent: Jul. 14, 1992

[54] BRUSHLESS GENERATOR REGULATED BY SECOND ROTOR

[75] Inventor: Tsuneo Sugiura, Iida, Japan

[73] Assignee: Tamagawa Seiki Kabushiki Kaisha, Tokyo, Japan

[21] Appl. No.: 679,621

[22] Filed: Apr. 3, 1991

[51] Int. Cl.⁵ .................. H02K 16/02; H02K 19/30
[52] U.S. Cl. ..................... 310/114; 310/90; 310/263; 322/46
[58] Field of Search ............ 310/68 D, 112, 114, 310/263; 322/46; 363/126, 145

[56] References Cited

U.S. PATENT DOCUMENTS

| 4,035,713 | 7/1977 | Kawamoto et al. | 322/46 |
| 4,782,257 | 11/1988 | Sechek et al. | 310/114 |

FOREIGN PATENT DOCUMENTS

| 1304137 | 4/1987 | U.S.S.R. | 310/114 |
| 315045 | 7/1929 | United Kingdom | 322/46 |
| 953911 | 4/1964 | United Kingdom | 310/114 |

OTHER PUBLICATIONS

Shinko Denki Technical Report No. 114, vol. 32, No. 3, pp. 112 to 117, issued in 1987.

Primary Examiner—Steven L. Stephan
Assistant Examiner—D. L. Rebsch
Attorney, Agent, or Firm—Brooks, Haidt, Haffner & Delahunty

[57] ABSTRACT

A generator includes a permanent magnet rotor (1) rotatably mounted within a casing, a Randell (claw-tooth) rotor (1A) mounted for rotation in unison with the permanent magnet rotor, an armature coil (5) associated with the permanent magnet rotor and the Randell rotor, and a field coil (16) associated with the Randell rotor. The output power generated by the permanent magnet rotor and the Randell rotor is obtained from the common armature coil. The generator may be suitably applied to aerospace equipment, unmanned flying objects or to unmanned marine cruising objects.

17 Claims, 8 Drawing Sheets

BRUSHLESS GENERATOR REGULATED BY SECOND ROTOR

BACKGROUND OF THE INVENTION

1. Field of the Invention

This invention relates to a generator and, more particularly, to a generator which is small-sized, lightweight, capable of developing an elevated velocity and suitably applied to aerospace equipment, unmanned flying objects or unmanned marine cruising objects, and in which the output voltage may be quickly adjusted automatically in response to load fluctuations or fluctuations in input speeds.

2. Prior Art

Typical of the arrangements of generators used for the aforementioned applications are those shown or pages 112 to 117 of Shinko Denki Technical Report No. 114, vol. 32, No. -3, issued in 1987.

FIGS. 1 to 5 show the arrangements of a conventional generator.

Figure 1:
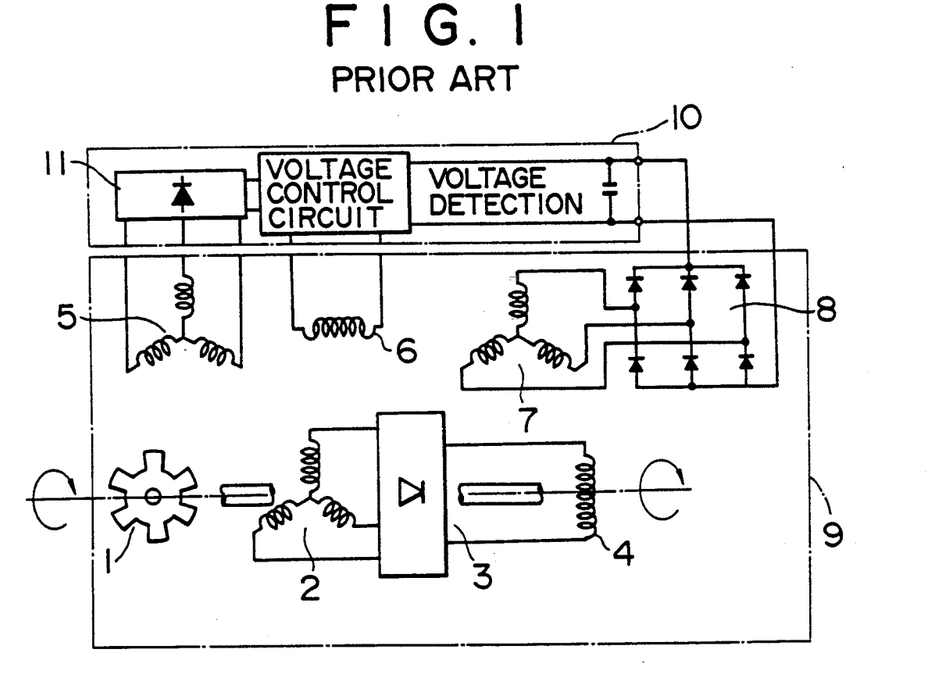
FIGS. 1 to 3 illustrate control control systems of respective power generating systems of prior-art generators.

First, FIG. 1 shows a first prior-art example of a brushless ac generator-rectifier circuit system which is constituted by a power generating section 9, made up of a permanent magnet rotor 1, an EX rotary armature 2, rotary rectifier 3, a main generator armature 4, a permanent magnet armature 5, an EX magnetic field 6, a main rotating magnetic field 7 of the generator and a rectifier 8, and a voltage regulator 10 connected to the power generating section 9. When the permanent magnet rotor 1 is rotated, a three-phase alternating current is generated in the permanent magnet armature 5.

This three-phase alternating current is converted by a rectifier circuit 11 within the voltage regulator 10 into a direct current for direct current excitation of the EX magnetic field 6. The three-phase ac power is generated in the EX rotary armature 2 in proportion to the magnitude of the dc excitation and converted into the dc power by the rectifier 8 enclosed the rotor for exciting the main rotating magnetic field 7 of the generator. Three-phase ac power is generated in the main generator armature 4 in an amount proportionate to the dc excitation and rectified to produce a dc output.

Figure 2:
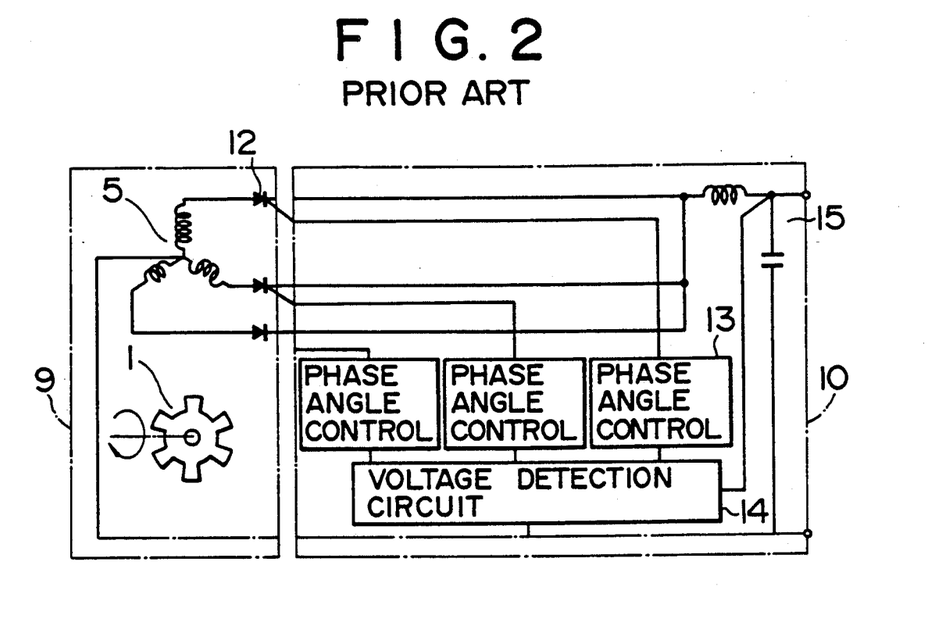

FIG. 2 shows a second prior-art example of a permanent magnet-thyristor phase control rectifier system, which is constituted by a generator 9, made up of a permanent magnet rotor 1, an armature 5 and a thyristor 12, and a voltage regulator 10, made up of a phase angle control 13, a voltage detection circuit 14 and a filter unit 15. The ac output from the generator is rectified by thyristor 12 by controlling its phase control angle and passed through filter unit 15 to produce a voltage-controlled dc output.

Figure 3:
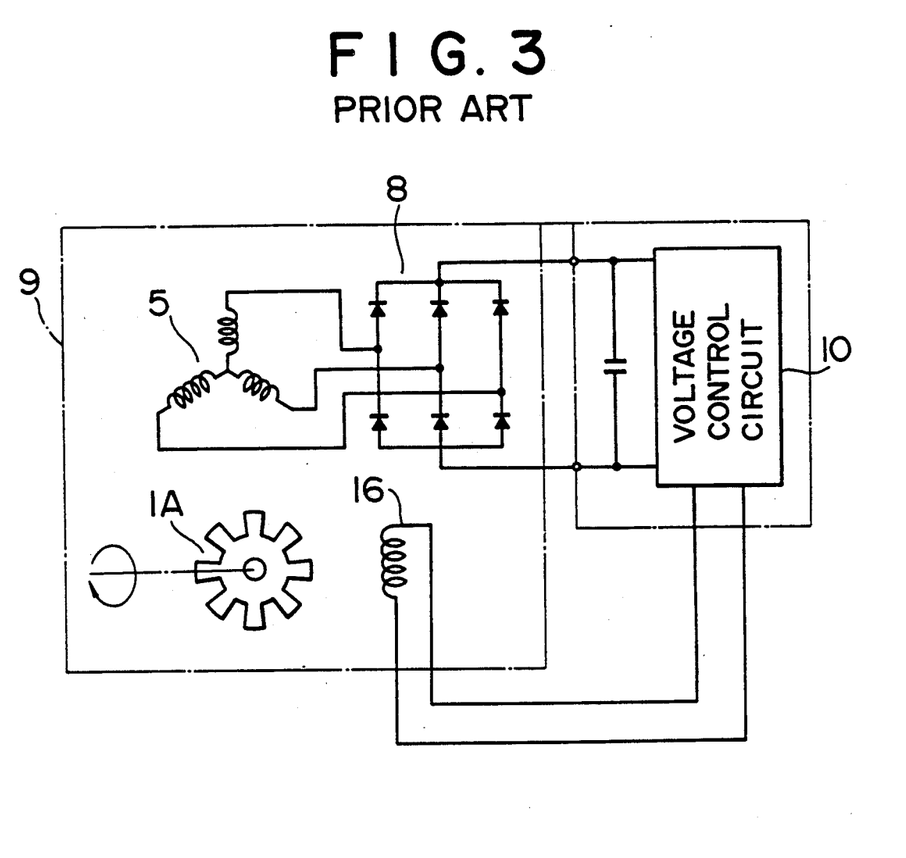
Figure 4:
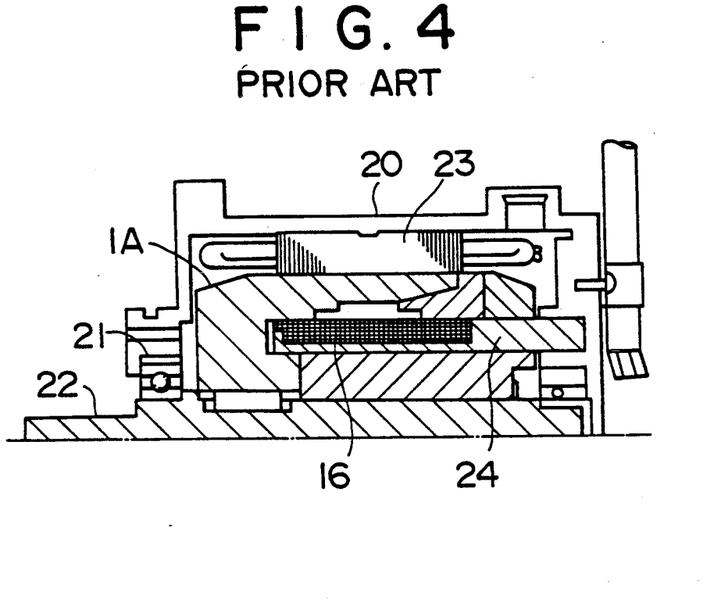
FIG. 4 is a side elevational view, shown partly in section, and showing a prior-art generator.
Figure 5:
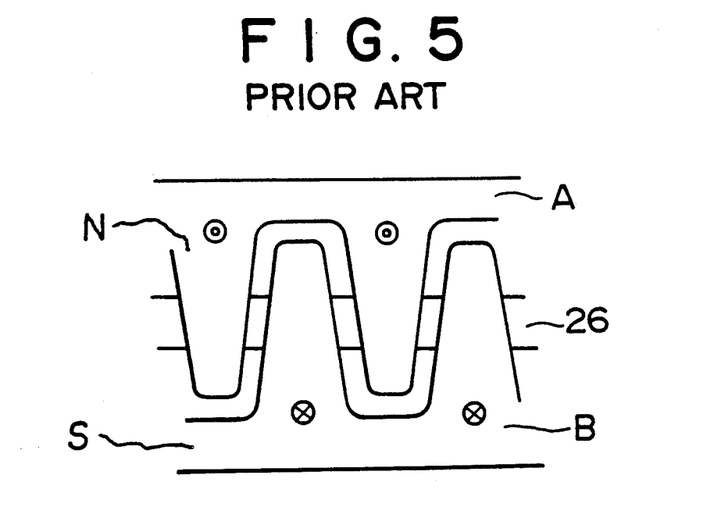
FIG. 5 is an illustrative view of the prior-art generator shown in FIG. 4.

FIGS. 3 to 5 show a third prior-art example of a so called Randell type ac generator-rectifier circuit system, which is constituted by a generator 9, made up of a Randell rotor 1A, a field winding 16, an armature winding 5 and a rectifier 8, and a voltage regulator 10.

The Randell type ac generator is constructed as shown in FIGS. 4 and 5, wherein a rotary shaft 22 is rotatably mounted in a casing 20 by means of a bearing 21, and the Randell rotor 1A is mounted on the rotary shaft 22.

A stator 23 for the armature winding 5 and a fixed field winding 16 provided on a fixed field core 24 are provided in the casing 20. The Randell rotor 1A is a claw tooth rotor made up of rotor A, rotor B and connecting ring 26.

Thus the magnetic fluxes generated by the fixed field winding 16 flow through an air gap, rotor A (N pole side), another air gap, the stator 23, a further air gap, the rotor B(S pole side), the fixed field core 24 and a still further air gap in this order.

On the surface of the Randell rotor 1A, as viewed from the armature side of the stator 23, magnetic poles of the rotating magnetic field are generated, as in the case of the usual synchronous generator.

Voltage control may be achieved easily by controlling the current through the fixed field winding.

The above described prior-art generators suffer from the following disadvantages.

The first type device, while being devoid of brushes, is highly complicated in construction, and is difficult to manufacture.

The second type device is simple in construction as a generator. However, the phase-controlled output waveform is poor as a result of velocity fluctuations and the use of a filter unit is not effective to improve the output voltage characteristics so that it is difficult to realize output compensations against sudden load fluctuations.

The third type device is thought to satisfy the requirements fairly well and hence it is currently in popular use. As a major disadvantage, the field current needs to be obtained by, for example, an initial external power source, while self-starting is not feasible.

The device also suffers from field current losses as compared to the rotating magnet type device, while it is also higher in weight.

In addition, the fixed field wiring needs to be controlled extensively against velocity or load fluctuations, while the field controller tends to be bulky.

OBJECTS AND SUMMARY OF THE INVENTION

It is therefore an object of the present invention to provide a generator the output voltage of which may be adjusted promptly automatically in response load fluctuations or fluctuations in input velocity.

It is another object of the present invention to provide a generator which is small-sized, lightweight and capable of developing a high operating velocity.

It is a further object of the present invention to provide a generator which may be suitably used in aerospace equipment, unmanned flying objects or to unmanned marine cruising objects.

The present invention provides a generator comprising a permanent magnet rotor rotatably mounted within a casing, a Randell auxiliary rotor mounted for rotation in unison with the permanent magnet rotor, an armature coil associated with the permanent magnet rotor and the Randell rotor, and a field coil associated with the Randell rotor.

With the generator of the present invention, the voltage output generated by the permanent magnet rotor and the power output generated by the Randell rotor may be combined to synthesize a stable output voltage of the permanent magnet type power generating section to exhibit excellent efficiency and the output of the Randell type power generating section to exhibit excellent controllability. Should the operating speed be lower, the output of the Randell type power generating section is added summed to that of the permanent magnet type power generating section to provide a stable output level. Conversely, should the operating speed be higher, the output of the Randell type generating section is lowered to maintain a stable output level. On sudden load application, the Randell type generating section is controlled immediately by the series field coil.

The Randell rotor of the Randell type generator may be excited by impressing the output obtained by the permanent magnet type power generating section to the Randell field coil consisting of a control coil and a series coil.

With the generator of the present invention, the following effects may be derived.

As described in the foregoing, since the permanent magnet type power generating section including the permanent magnet rotor having the high power generation efficiency and the Randell type power generating section including the Randell rotor exhibiting high controllability are combined into one generator for rotation in unison with each other, and the armature winding as the output coil is used in common, a stable output level may be achieved promptly by controlling the Randell type generator as a function of the fluctuations in the rotational speed of the generator.

In case of larger torque fluctuations, the Randell type power generating section may be controlled by the series field coil connected directly to the load, without any accompanying time lag, such that a stable output level may be produced without applying a larger current load to the field controller.

Thus the prompt control of the stable output level against load fluctuations or fluctuations in the rotational velocity, which cannot be obtained with the permanent magnet type generating section or with the Randell type generating section, when used above, may be achieved easily and reliably, and a generator may be provided which is best suited to aerospace equipment, unmanned flying objects and unmanned marine cruising objects.

DETAILED DESCRIPTION OF THE PREFERRED EMBODIMENTS

By referring to the drawings, illustrative embodiments of the generator of the present invention will be explained in detail.

In the drawings, the parts or components similar to those of the prior-art examples are depicted by the same reference numerals.

Figure 6:
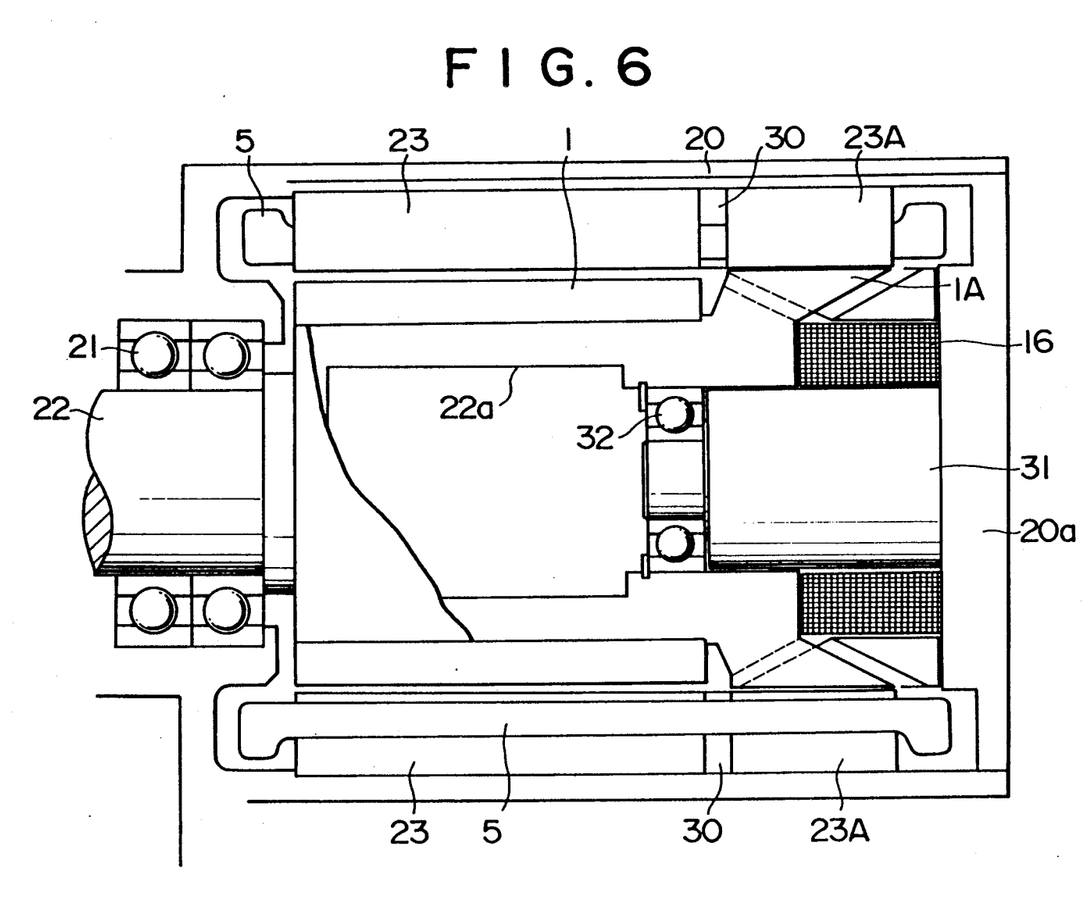
FIG. 6 is a side elevational view, shown partially in cross-section, and showing a generator according to an embodiment of the present invention.

Referring to FIGS. 6 to 10 showing the generator of the present invention, and first to FIG. 6, a hollow rotating member 22 is mounted for rotation within a casing 20 by means of a bearing 21. On the hollow rotating member 22, a permanent magnet rotor 1, composed mainly of rare earth elements, and a Randell rotor 1A, which is the same as that described in connection with FIG. 5, are provided in tandem along the axis of the rotating member 22.

On the inner wall of the casing 20, a stator 23 for the permanent magnet rotor and a stator 23A for the Randell rotor 1A are separately provided by the interposition of a non-magnetic member 30, such as an air gap, in order to prevent an interference loop from being generated between the stators 23 and 23A. A common one-piece armature winding 5 for the stators 23 and 23A is associated, as an output coil, with the stators 23 and 23A.

A bearing 32 is carried by the distal end of a retainer 31 provided on a side wall 20a of the casing 20 for protruding axially into the interior of the casing 20. The rotating member 22 is rotatably supported at a mid position of a hollow section 22a thereof by the bearing 32 for improving the rigidity in the rotational support of the rotating member 22.

Figure 8:
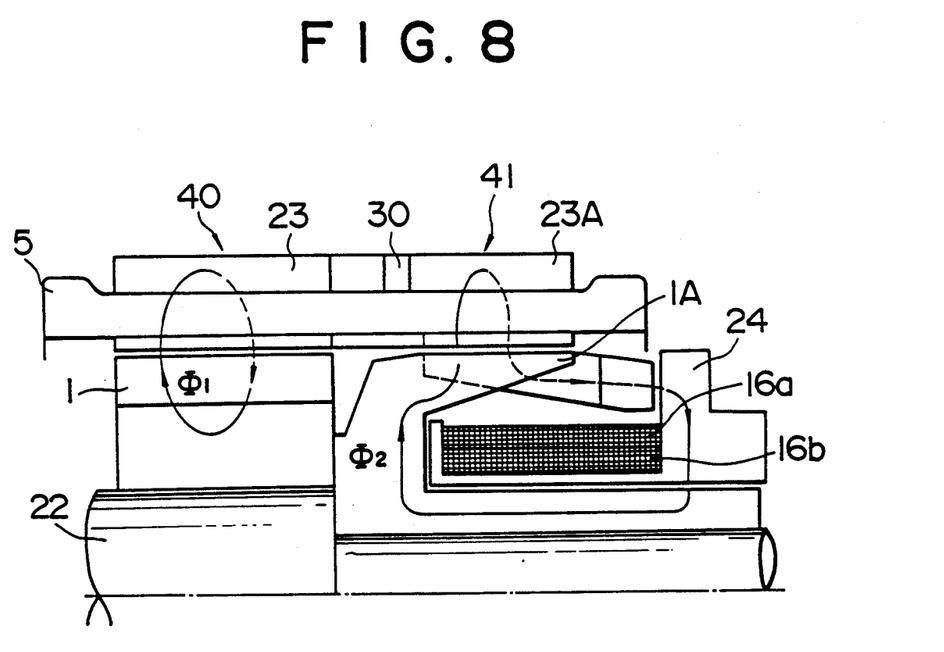
FIG. 8 is a schematic side elevational view showing a portion of FIG. 7 in detail.
Figure 10:
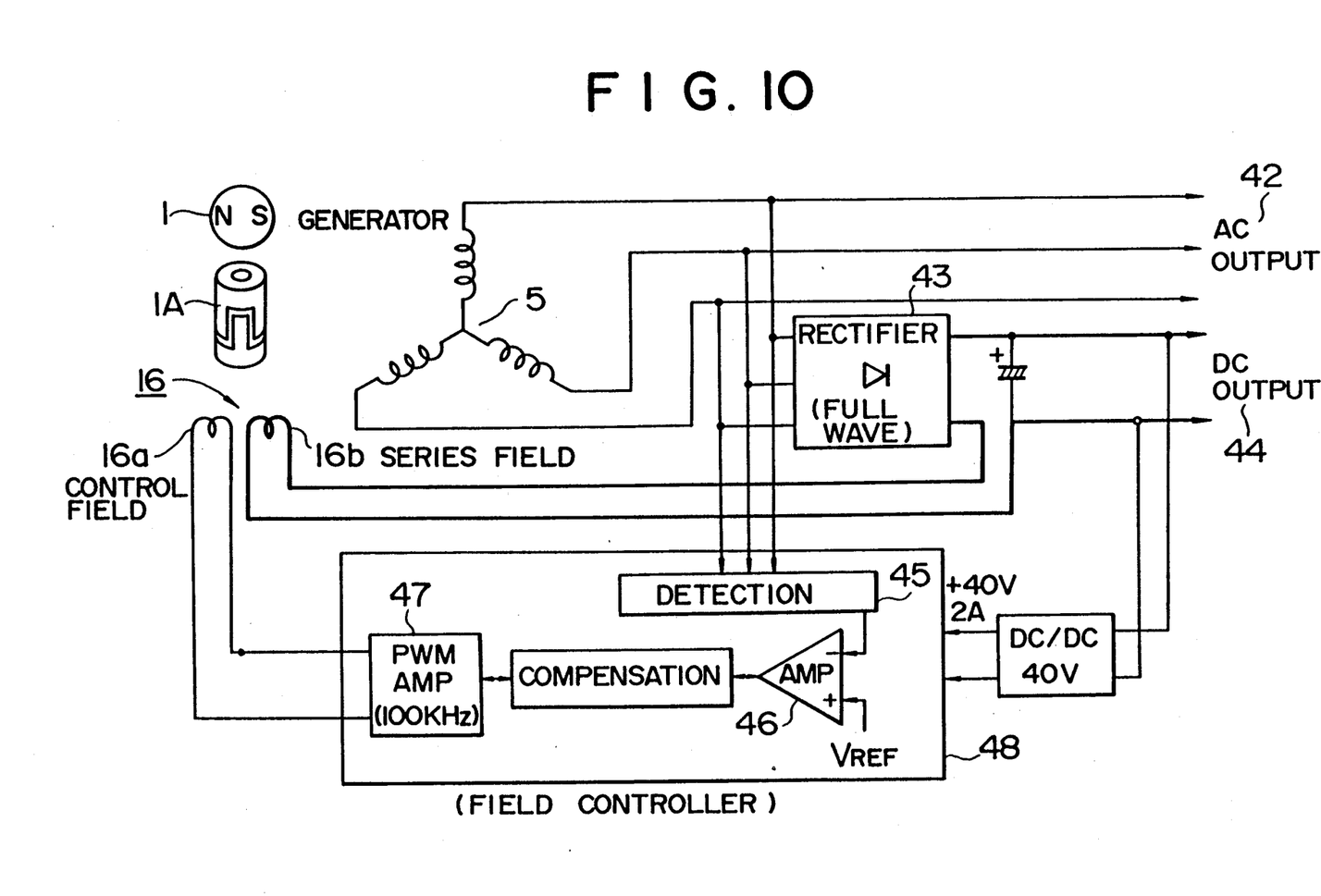
FIG. 10 illustrates a control unit for a power generating system, of the generator shown in FIG. 6.

A Randell field coil 16 consisting of a control coil 16a and a series coil 16b as shown in FIG. 8 and 10 is placed on the outer periphery of the retainer 31.

Figure 7:
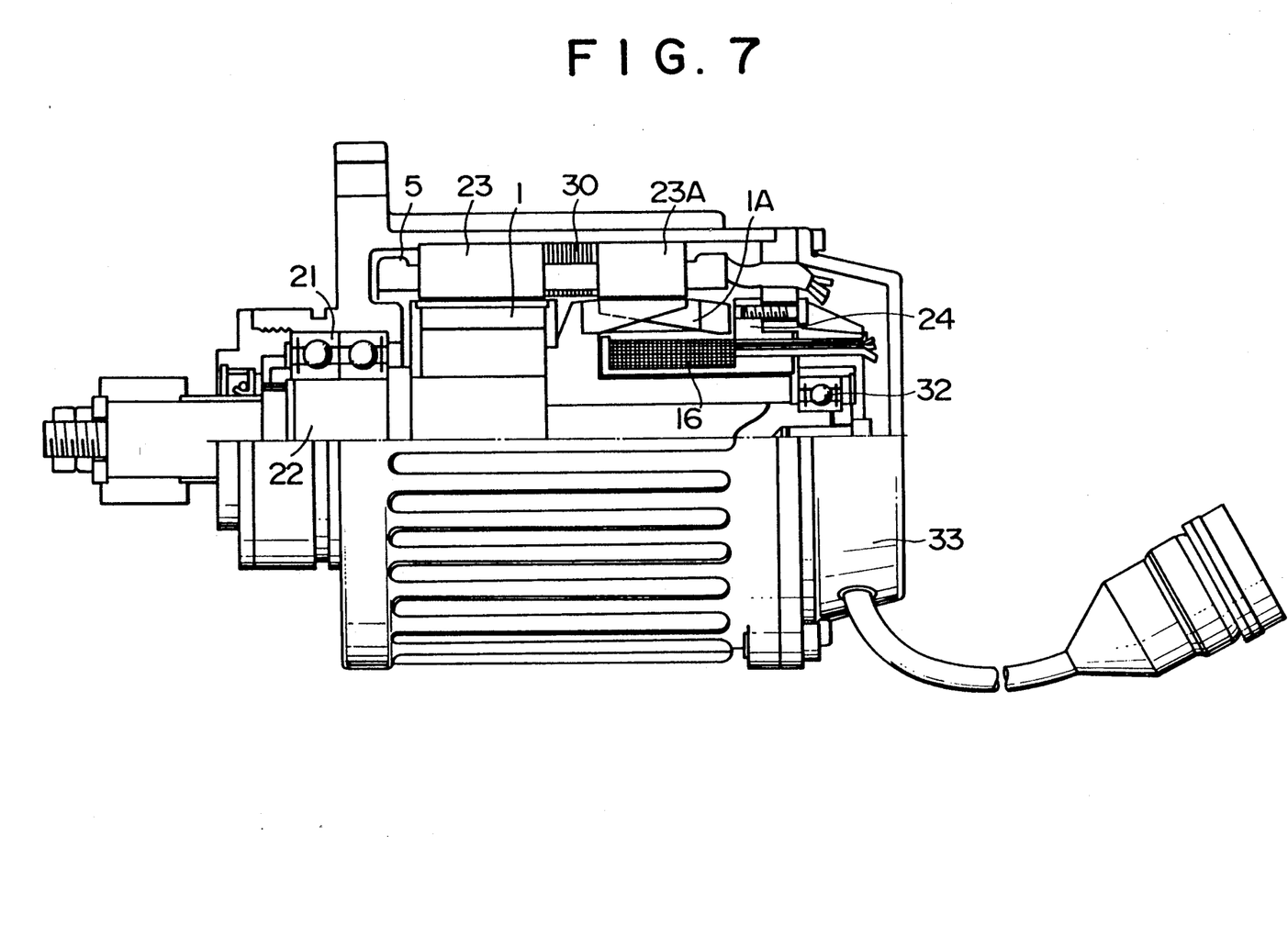
FIG. 7 is a side elevational view, shown partially in section, and showing a generator according to a modification.

Referring to FIG. 7, showing a modification of the embodiment shown in FIG. 6, the same or similar parts are indicated by the same reference numerals, and the corresponding description is omitted for simplicity. The modification of FIG. 7 is similar to the embodiment shown in FIG. 6 except that the bearing 32 is provided towards the terminal portion of the rotating member 22, instead of at the mid portion thereof, and the Randell field coil 16 is retained by a magnetic bobbin 24. A cover 33 provided on the casing 20 is fitted with a connector 34 for feeding the generated output power from the generator.

Referring to FIG. 8, details of certain portions of the construction of FIG. 7 are shown to an enlarged scale, while the magnetic fluxes through the permanent magnet type power generating section 40 and the Randell type power generating section 41 are also shown. The parts or components similar to those shown in FIG. 7 are indicated by the same reference numerals and the corresponding description is omitted for simplicity.

FIG. 10 shows a control unit for the power generating system. An ac output 42, that is the three-phase ac voltage, produced by the armature winding 5, is taken out directly, while a dc output 44 is taken out by means of a rectifier circuit 43.

Part of the ac output 42 and the dc output 44 are supplied to the control field 16a, as the fixed side, by means of a field controller 48, consisting of a detection circuit 45, a comparator 46 and a waveform modulation/amplifier circuit 47, while part of the dc output 44 is supplied to the series field coil 16b on the load side.

The above described generator of the present invention operates in the following manner.

When the rotating member 22 and thereby the permanent magnet rotor 1 start their rotation power generation is started by the permanent magnet rotor 1 in the armature winding 5. With increase in the rotational speed of the rotor, the ac output 42 is generated along an output characteristic curve of the permanent magnet power generating section 40 shown in FIG. 8.

The ac output 42 is full-wave rectified by the rectifier circuit, 43 so as to be used as a power source (+40 V, 2A) for the field controller 48.

The field controller 48 starts its operation when the ac output 42 is supplied thereto. Thus the field controller 48 detects the generated voltage by the detection circuit 45 and, if the detected voltage is lower than the required stable output level, with the rotational speed being not more than $N_2$, a magnetic flux $\phi 2$ is generated by the control field coil 16a of the Randell rotor 1A in a direction which adds to magnetic flux $\phi 1$ generated by the permanent magnet rotor 1, thereby providing a stable output level as indicated by a control region A shown in FIG. 9.

Figure 9:
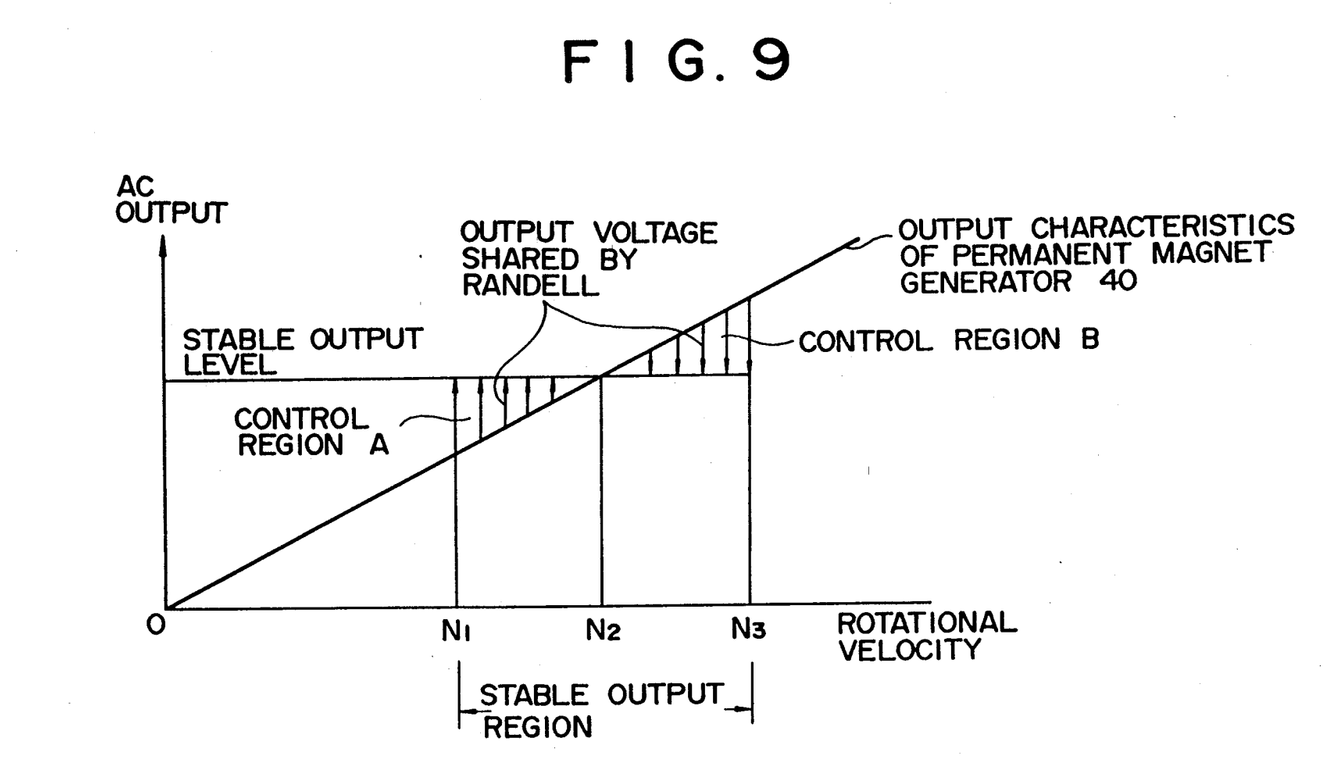
FIG. 9 is a diagram showing output characteristics of the generator shown in FIG. 6.

When the rotational speed of the rotating member 22 is increased further, such that the output of the permanent magnet power generating section 40 exceeds the stable output level, the control field coil 16a is controlled for generating, the magnetic flux $\phi 2$ in a direction which subtracts from the magnetic flux $\phi 1$ for providing a stable output level shown by a control region B.

Should there occur load fluctuations, a large current flows simultaneously through the series field coil 16b connected in series with the load, thereby directly compensating the load fluctuations at the Randell power generating section 41 without the intermediary of the field controller 48 without any accompanying time lag.

In this manner, owing to the control operations by both the control field coil 16a and the series field coil 16b of the self-starting Randell power generating section 41, a stable output level may be established and maintained promptly against load fluctuations and fluctuations in the rotational velocities.

Although the foregoing description has been made of the embodiment in which the permanent magnet power generating section 40 and the Randell power generating section 41 are arranged in tandem along the axial direction, the present invention may also be applied to a radial type system or to an axial gap type or a disc type system in which the Randell stator 23A and the Randell rotor 1A in the Randell power generating system 41 are arranged axially, instead of radially, and in opposition to each other.

What is claimed is:

1. A generator comprising a permanent magnet rotor rotatably mounted within a casing, a Randell rotor mounted for rotation in unison with said permanent magnet rotor, an armature coil associated with said permanent magnet rotor and said Randell rotor, and a field coil associated with said Randell rotor, the output power generated by said permanent magnet rotor and said Randell rotor being obtained from said armature coil.

2. The generator according to claim 1 wherein said permanent magnet rotor, and said Randell rotor are arranged in series in the axial direction.

3. The generator according to claim 1, wherein said armature coil is common to said permanent magnet rotor and said Randell rotor.

4. The generator according to claim 1, wherein said Randell field coil consists of a field magnet coil and a series field coil.

5. The generator according to claim 1, wherein a stator core of said armature coil is divided by a nonmagnetic material into a stator for said permanent magnet rotor and a stator for said Randell rotor.

6. The generator according to claim 1, wherein said permanent magnet rotor and said Randell rotor are of different diameters and arranged coaxially.

7. The generator according to claim 2, wherein said armature coil is common to said permanent magnet rotor and said Randell rotor.

8. The generator according to claim 2, wherein said Randell field coil consists of a field magnet coil and a series field coil.

9. The generator according to claim 3, wherein said Randell field coil consists of a field magnet coil and a series field coil.

10. The generator according to claim 7, wherein said Randell field coil consists of a field magnet coil and a series field coil.

11. The generator according to claim 2, wherein a stator core of said armature coil is divided by a nonmagnetic material into a stator for said permanent magnet rotor and a stator for said Randell rotor.

12. The generator according to claim 3, wherein a stator core of said armature coil is divided by a nonmagnetic material into a stator for said permanent magnet rotor and a stator for said Randell rotor.

13. The generator according to claim 4, wherein a stator core of said armature coil is divided by a nonmagnetic material into a stator for said permanent magnet rotor and a stator for said Randell rotor.

14. The generator according to claim 7, wherein a stator core of said armature coil is divided by a nonmagnetic material into a stator for said permanent magnet rotor and a stator for said Randell rotor.

15. The generator according to claim 8, wherein a stator core of said armature coil is divided by a nonmagnetic material into a stator for said permanent magnet rotor and a stator for said Randell rotor.

16. The generator according to claim 9, wherein a stator core of said armature coil is divided by a nonmagnetic material into a stator for said permanent magnet rotor and a stator for said Randell rotor.

17. The generator according to claim 10, wherein a stator core of said armature coil is divided by a nonmagnetic material into a stator for said permanent magnet rotor and a stator for said Randell rotor.

* * * * *